United States Patent [19]

Wheat

[11] Patent Number: 5,630,129
[45] Date of Patent: May 13, 1997

[54] DYNAMIC LOAD BALANCING OF APPLICATIONS

[75] Inventor: Stephen R. Wheat, Albuquerque, N.M.

[73] Assignee: Sandia Corporation, Albuquerque, N.M.

[21] Appl. No.: 161,003

[22] Filed: Dec. 1, 1993

[51] Int. Cl.⁶ ............................................ G06F 15/00
[52] U.S. Cl. ..................... 395/675; 395/800; 364/281; 364/281.6; 364/281.4; 364/DIG. 1
[58] Field of Search ................................. 395/650, 700, 395/800

[56] References Cited

U.S. PATENT DOCUMENTS

| | | | |
|---|---|---|---|
| 4,670,899 | 6/1987 | Brody et al. | 379/60 |
| 4,748,558 | 5/1988 | Hirosawa et al. | 395/650 |
| 5,053,950 | 10/1991 | Naganuma et al. | 395/650 |
| 5,072,371 | 12/1991 | Benner et al. | 395/200.3 |
| 5,115,505 | 5/1992 | Bishop et al. | 395/650 |
| 5,198,979 | 3/1993 | Moorhead et al. | 364/421 |
| 5,241,677 | 8/1993 | Naganuma et al. | 395/650 |
| 5,253,248 | 10/1993 | Dravida et al. | 370/16 |
| 5,283,897 | 2/1994 | Georgiadis et al. | 395/650 |
| 5,303,383 | 4/1994 | Neeches et al. | 395/500 |
| 5,321,813 | 6/1994 | McMillen et al. | 395/200 |

OTHER PUBLICATIONS

Leiss, E.L., et al., "Distributed Loan Balancing: Design, Performance, and Experiments," *W.M. Keck Research Computation Lab.*, vol. 5, pp. 205–270 (1989).

Wheat, S.R., "A Fine Grained Data Migration Approach to Application Loan Balancing on MP MIMD Machines," (Ph.D. thesis, University of New Mexico, Dept. of Computer Science, Albuquerque, Dec. 1992).

*Primary Examiner*—Kevin A. Kriess
*Assistant Examiner*—John Q. Chavis
*Attorney, Agent, or Firm*—Timothy D. Stanley

[57] ABSTRACT

An application-level method for dynamically maintaining global load balance on a parallel computer, particularly on massively parallel MIMD computers. Global load balancing is achieved by overlapping neighborhoods of processors, where each neighborhood performs local load balancing. The method supports a large class of finite element and finite difference based applications and provides an automatic element management system to which applications are easily integrated.

20 Claims, 9 Drawing Sheets

---

Provide a computer program application for execution to a plurality of processors of a parallel computer for processing the application that is to be executed, the application comprising a plurality of data cells arranged spatially such that each data cell has one or more neighboring data cells.

↓

Assign each data cell a processor within the plurality of processors.

↓

Determine, for one or more of the plurality of processors, all other processors in one or more corresponding processor neighborhoods.

↓

Compute work loads for the one or more of the plurality of processors.

↓

Export, for the one or more of the plurality of processors, one or more data cells to another processor in the one or more corresponding processor neighborhoods to achieve a dynamic and global balance of the work load between the plurality of processors.

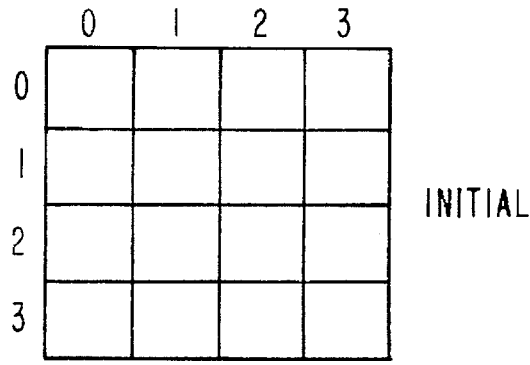
INITIAL
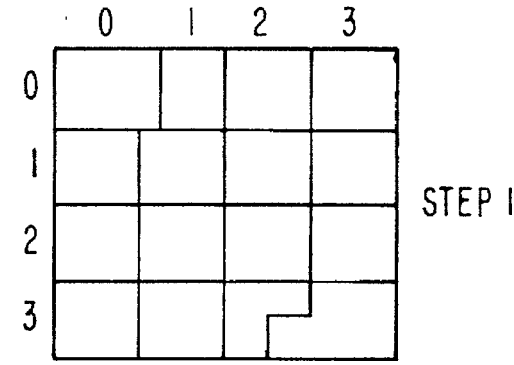
STEP 1
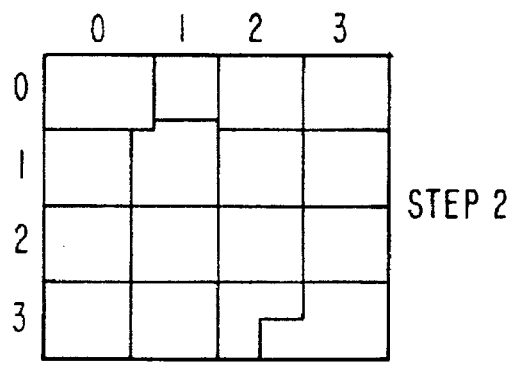
STEP 2
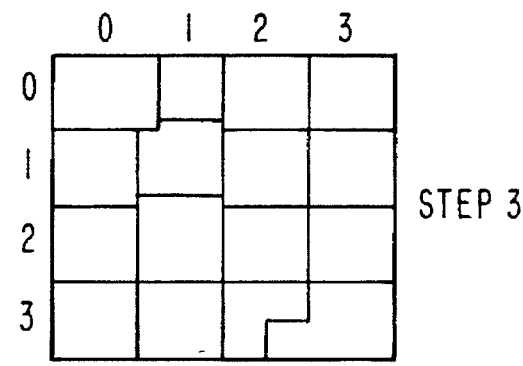
STEP 3
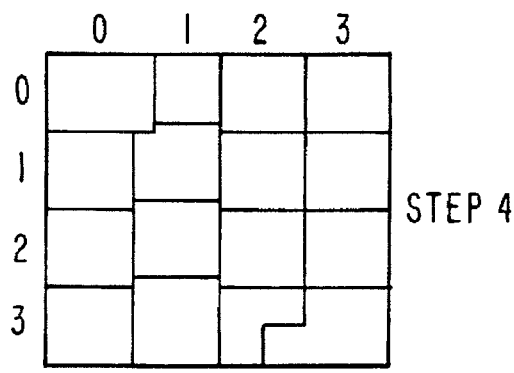
STEP 4
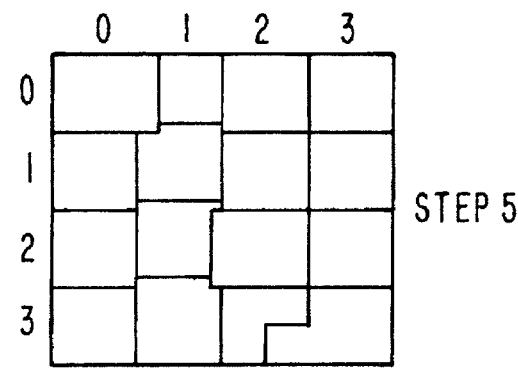
STEP 5
FIG-1

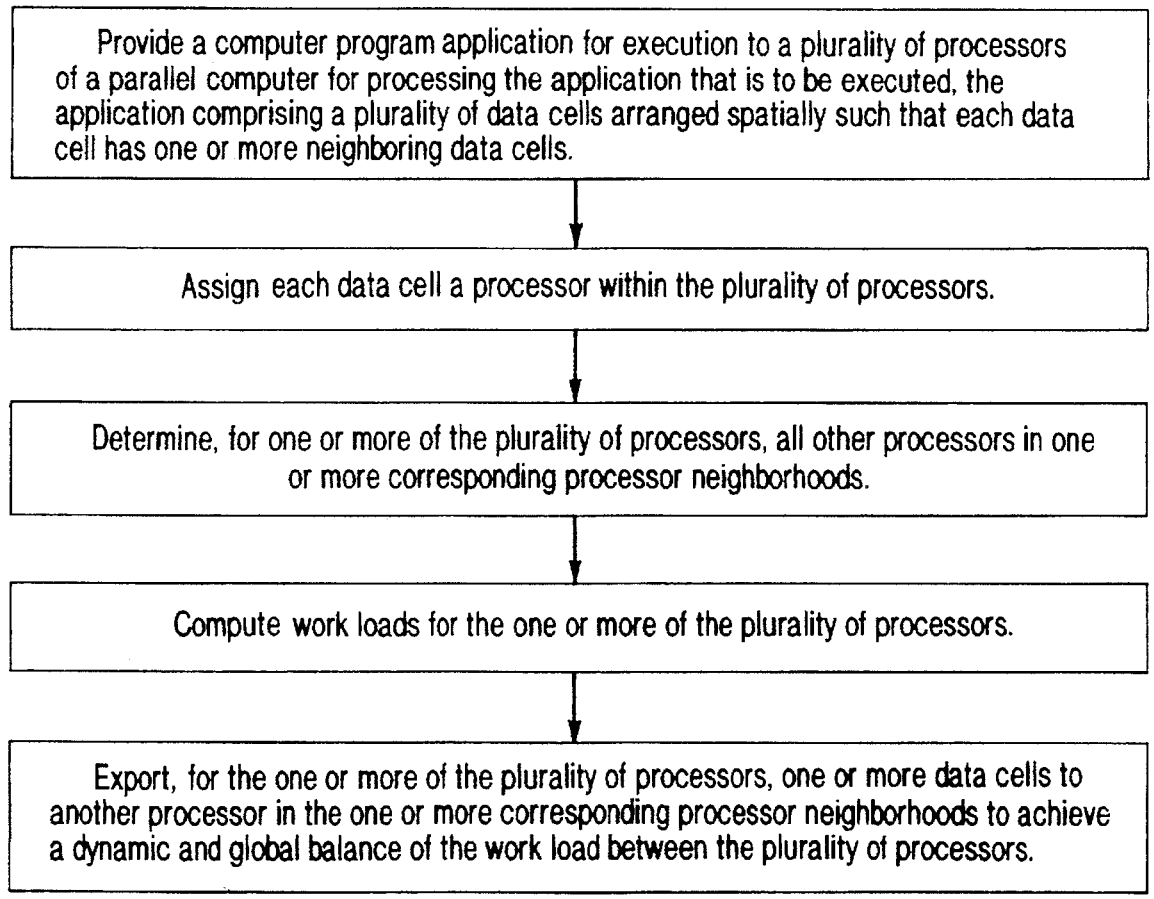
FIG—1a

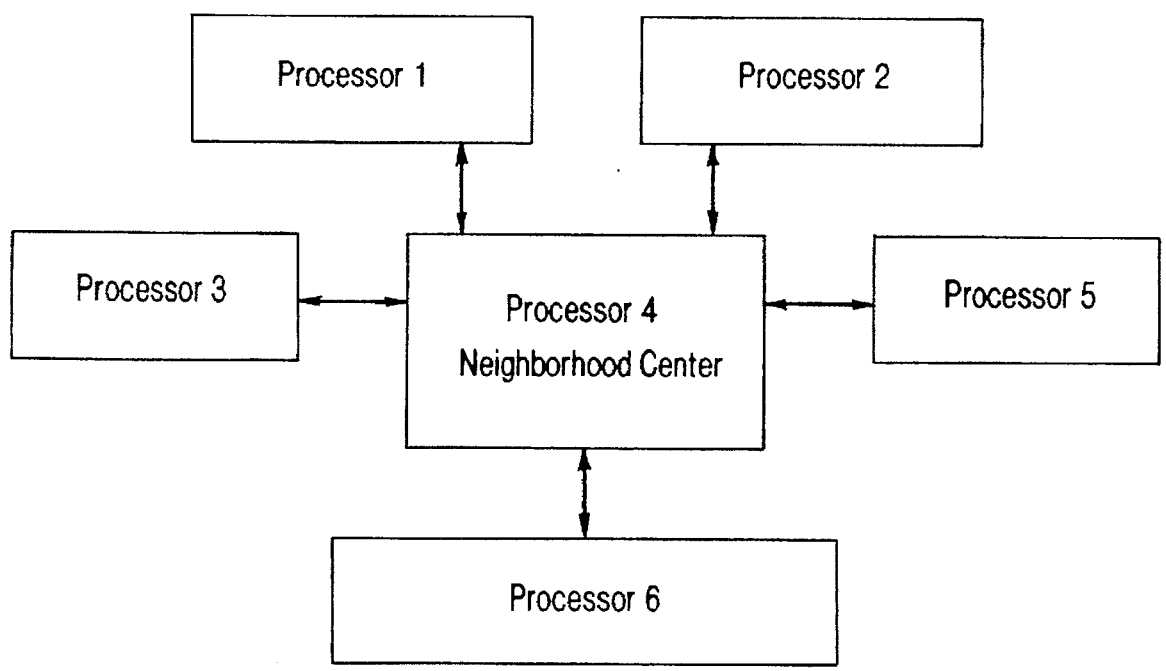
FIG — 1b

▨ LOCAL INTERNAL ELEMENT   ☐ GHOST ELEMENT
▧ LOCAL BOUNDARY ELEMENT

▨ PROCESSOR SUBDOMAIN

| 1 WORK: 25 | 2 WORK: 41 | 3 WORK: 25 PRIORITY: -2 |
|---|---|---|
| 4 WORK: 41 | 5 WORK: 41 | 6 WORK: 13 PRIORITY: -1 |
| 7 WORK: 41 | 8 WORK: 13 | 9 WORK: 5 PRIORITY: -1 |
| 10 WORK: 13 | 11 WORK: 5 | 12 WORK: 5 PRIORITY: -2 |

ELEMENTS 3,6,9, AND 12 ARE ELIGIBLE FOR EXPORT.
INITIAL WORK REQUEST = 55

| 1 WORK: 25 | 2 WORK: 41 | 3 WORK: 25 PRIORITY: 1 | |
|---|---|---|---|
| 4 WORK: 41 | 5 WORK: 41 PRIORITY: 1 | | 6 WORK: 13 |
| 7 WORK: 41 | 8 WORK: 13 | 9 WORK: 5 PRIORITY: 2 | |
| 10 WORK: 13 | 11 WORK: 5 | 12 WORK: 5 PRIORITY: -2 | |

ELEMENT 6 IS SELECTED FOR EXPORT; ELEMENT 5 BECOMES
AN EXPORT CANDIDATE. WORK REQUEST = 42.

| 1 WORK: 25 | 2 WORK: 41 | 3 WORK: 25 PRIORITY: 1 | |
|---|---|---|---|
| 4 WORK: 41 | 5 WORK: 41 PRIORITY: -1 | | 6 WORK: 13 |
| 7 WORK: 41 | 8 WORK: 13 PRIORITY: -1 | | 9 WORK: 5 |
| 10 WORK: 13 | 11 WORK: 5 | 12 WORK: 5 PRIORITY: 1 | |

AFTER THE SECOND SELECTION, WORK REQUEST = 37.

| 1 WORK: 25 | 2 WORK: 41 PRIORITY: -2 | 3 WORK: 25 |
|---|---|---|
| 4 WORK: 41 | 5 WORK: 41 PRIORITY: -1 | 6 WORK: 13 |
| 7 WORK: 41 | 8 WORK: 13 PRIORITY: -1 | 9 WORK: 5 |
| 10 WORK: 13 | 11 WORK: 5 | 12 WORK: 5 PRIORITY: 1 |

AFTER THE THIRD SELECTION, WORK REQUEST = 12

| 1 WORK: 25 | 2 WORK: 41 PRIORITY: -2 | 3 WORK: 25 |
|---|---|---|
| 4 WORK: 41 | 5 WORK: 41 PRIORITY: -1 | 6 WORK: 13 |
| 7 WORK: 41 | 8 WORK: 13 PRIORITY: -1 | 9 WORK: 5 |
| 10 WORK: 13 | 11 WORK: 5 PRIORITY: -2 | 12 WORK: 5 |

AFTER THE FOURTH SELECTION, WORK REQUEST = 7
NO OTHER ELEMENTS ARE EXPORTED.

DYNAMIC LOAD BALANCING OF APPLICATIONS

GOVERNMENT RIGHTS

The Government has rights to this invention pursuant to Contract No. DE-AC04-76DP00789 awarded by the U.S. Department of Energy.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention (Technical Field)

The present invention relates to methods and apparatuses for load balancing on parallel computers, particularly massively parallel Multiple Instruction stream, Multiple Data stream (MIMD) computers.

2. Background Art

Distributed memory, massively parallel, MIMD technology has enabled the development of applications requiring computational resources previously unobtainable. Structural mechanics and fluid dynamics applications, for example, are often solved by finite difference or finite element methods requiring millions of degrees of freedom to accurately simulate physical phenomenon. On massively parallel computers, finite difference and finite element methods frequently result in distributed processor load imbalances. To overcome load imbalance, many massively parallel methods use static load balancing as a preprocessor to the finite element calculation. Fox et al, *Solving Problems on Concurrent Processors, Volume* 1 (Prentice Hall, Englewood, N.J., 1988); Hammond, *Mapping Unstructured Grid Computations to Massively Parallel Computers* (Ph.D. thesis, Rensselaer Polytechnic Institute, Dept. of Computer Science, Troy, N.Y., 1992); Hendrickson et al, "Multidimensional Spectral Load Balancing," Sandia National Laboratories Tech. Rep. SAND93-0074; and Kernighan et al, "An Efficient Heuristic Procedure for Partitioning Graphs," *Bell Systems Tech. J.* 29:291–307 (1970). Adaptive finite difference and finite element methods, which automatically refine or coarsen meshes and vary the order of accuracy of the numerical solution, offer greater robustness and computational efficiency than traditional methods by reducing the amount of computation required away from physical structures such as shock waves and boundary layers. Adaptive methods, however, complicate the load imbalance problem since the work per element is not uniform across the solution domain and changes as the computation proceeds. Therefore, dynamic load balancing is required to maintain global load balance.

The present invention is of a fine-grained, data driven, dynamic load balancing method referred to herein as "tiling". The invention is most useful for finite-element and finite-difference based applications. The method differs from those that use tasks as the unit of migration to achieve load balancing, such as Kale, "Comparing the Performance of Two Dynamic Load Distribution Methods," *Int'l Conf. Of Parallel Processing* (1988); Kao et al, "An Experimental Implementation of Migration Algorithms on the Intel Hypercube," *Int'l J. of Supercomputer Applications* Vol. 1, No. 2, 75–99 (1987); Leiss et al, "Distributed Load Balancing: Design and Performance Analysis," W. M. Keck *Research Computation Lab.* 5:205–70 (1989); Lin et al, "The Gradient Model Load Balancing Method," *IEEE Trans. on Software Eng.* (July 1987); Reddy, *On Load Balancing* (Ph.D. thesis, University of Houston, Dept. of Computer Science, 1989); Suen et al, "Efficient Task Migration Algorithm for Distributed Systems," *IEEE Trans. on Parallel and Distributed Systems* 488–99 (July 1992); and Schwederski et al, "A Model of Task Migration in Partitionable Parallel Processing Systems," *IEEE Second Symposium On the Frontiers of Massively Parallel Computations* 211–14 (1988). The present invention, to the contrary, uses a fine-grained, data-element based method for intra-application load balancing.

SUMMARY OF THE INVENTION
(DISCLOSURE OF THE INVENTION)

The present invention is of a method and apparatus for dynamically maintaining global load balance on a parallel computer, comprising: providing an application for execution to a plurality of processors of the parallel computer, the application comprising a plurality of data cells arranged spatially such that each data cell has one or more neighboring data cells; assigning each data cell to a processor; determining for one or more processors all other processors in corresponding processor neighborhoods; computing work loads for one or more processors; and for one or more processors, exporting one or more data cells to another processor in a corresponding processor neighborhood. In the preferred embodiment, the determining, computing and exporting tasks are performed repeatedly until the application has completed execution, and global load imbalance is minimized within a finite number of iterations. The applications thought to benefit most from the invention are finite-difference and finite-element applications, wherein the data cells are elements forming the basis of finite-difference and finite-element numerical techniques. The reassigning task preferably prioritizes data cells to select which data cells to export by: initially assigning a zero priority to all data cells; decreasing a data cell's priority by one for each data cell neighbor assigned to the same processor as the data cell; increasing a data cell's priority by two for each data cell neighbor assigned to a processor requesting importation of the data cell; and decreasing a data cell's priority by two for each data cell neighbor assigned to a concerned partner processor. The determining task preferably determines for one or more processors all other processors in corresponding processor neighborhoods. The present invention may be employed both for applications in which the data cells are arranged in a two-dimensional grid or in a three-dimensional grid.

A primary object of the present invention is to provide for dynamic load balancing of applications to achieve high parallel efficiency.

Another object of the present invention is to provide a method of dynamic load balancing which is easily integratable into application programs.

A primary advantage of the present invention is that it is effective for a wide class of finite element and finite difference applications with both fixed and dynamic per-element processing costs.

Another advantage of the present invention is that it is highly modularizable, providing for ease of use by application programmers not skilled in parallel computing science.

An additional advantage of the present invention is that an implementation thereof is easily ported from one massively parallel MIMD architecture to another.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is an illustration of load balancing performed according to the present invention;

FIG. 1a is a flowchart of the method in accordance with the present invention.

FIG. 1b is a block diagram of an exemplary embodiment of the apparatus in accordance with the present invention.

FIG. 4 is an illustration of element priorities and the export element selection method of the present invention;

Figure 2:
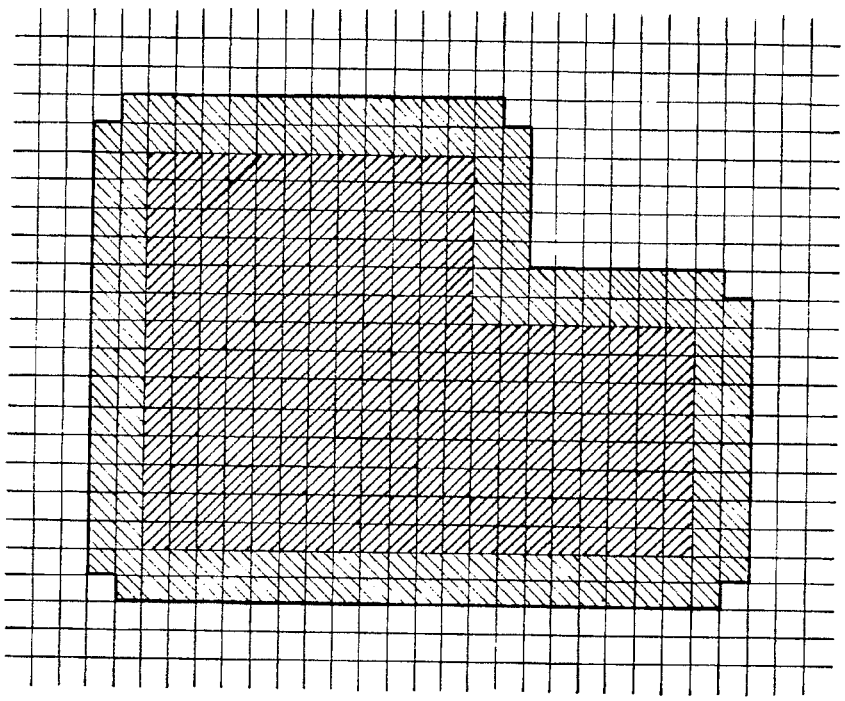
FIG. 2 is an illustration showing the element classes of the present invention.

DESCRIPTION OF THE PREFERRED EMBODIMENTS (BEST MODES FOR CARRYING OUT THE INVENTION)

The present invention is of a method and apparatus for dynamically load balancing applications on parallel computers (particularly massively parallel MIMD computers) to achieve high parallel efficiency. For each processor allocated to the execution of a program, the ideal improvement in execution time is obtained when the execution time satisfies time(n)=time(1)/n, where time(n) is the time it takes to execute the application on n processors. Applications whose performance behavior is close to this ideal have high parallel efficiency.

The present invention helps application programmers achieve expected speed-ups while retaining an acceptable level of program abstraction. To integrate an application into the load balancing method of the present invention, one specifies the data communication patterns, per-element processing, and boundary element processing of the application. The run-time system then automatically performs data migration to achieve global load balance.

The method of the present invention, the steps which are shown in FIG. 1a, herein also referred to as "tiling", builds on the work of Leiss and Reddy. Leiss and Reddy use local balancing performed within overlapping processor neighborhoods to achieve global load balance, where a neighborhood is defined as a processor at the center of a circle of some predetermined radius and all other processors within the circle. Processors within a given neighborhood are balanced with respect to each other using local (as opposed to global) performance measurements. Individual processors may belong to several neighborhoods. Work can be migrated from a processor to any other processor within the same neighborhood.

In tiling, the definition of a neighborhood is extended to include all processors whose elements are neighbors of elements in the center processor. Elements are migrated only to processors owning neighbors of the migrating elements. FIG. 1 illustrates an example of the dynamic balancing provide by tiling. Without a priori knowledge, the data set is divided evenly among 16 processors. After some period, processors (0,1) and (3,2) are discovered to be more heavily utilized than their neighbors. At this time, processor (0,0) receives some of the data originally allocated to processor (0,1), and processor (3,2) gives processor (3,3) some of its data, as shown in Step 1. Processors (0,0) and (0,1) are now equally balanced yet out of balance with other processors. Thus, in Step 2, some data is migrated from processor (0,1) to processor (1,1). The ripple effect continues to move through processors (2,1) and (3,1) during subsequent balancing steps.

Element migration causes tiles to take on irregular shapes, leading to more complicated communication patterns. However, the larger per-processor memory sizes in recently introduced massively parallel machines, see Thinking Machines Corp., CM-5 Technical Summary (January 1992); Intel Paragon Supercomputers Sales Literature No. 203/6/92/10K/GA (1992); and nCUBE Corp., nCUBE 3 Technical Overview (1992), make communication costs less of an issue than formerly. As programmers increase the data set sizes to fill the larger memories, the ratio of additional computation to additional communication increases. Thus, communication costs need not be a primary concern in load balancing, especially since the resulting reduction in execution time outweighs the additional communication costs. The tiling method of the invention, however, attempts to maintain reasonably shaped tiles to control communication costs.

In the present specification and claims, certain terms are defined as follows. "Elements" are the data structures that form the basis of finite-difference or finite-element numerical techniques. Elements are separated into two classes: "local" elements are elements assigned to a particular processor; and "ghost" elements represent element data and interconnections for elements that are assigned to other processors. An "internal local element" has all its element neighbors local to the same processor; a "boundary local element" has at least one element neighbor assigned to another processor. FIG. 2 illustrates the basic element classes for a given processor.

"Data cells" are data structures (including elements) operated on by an application amenable to parallel processing. Data cells may be "local", "internal local", "ghost", and "boundary local", as with elements, and may be manipulated according to the tiling method of the present invention.

Figure 3:
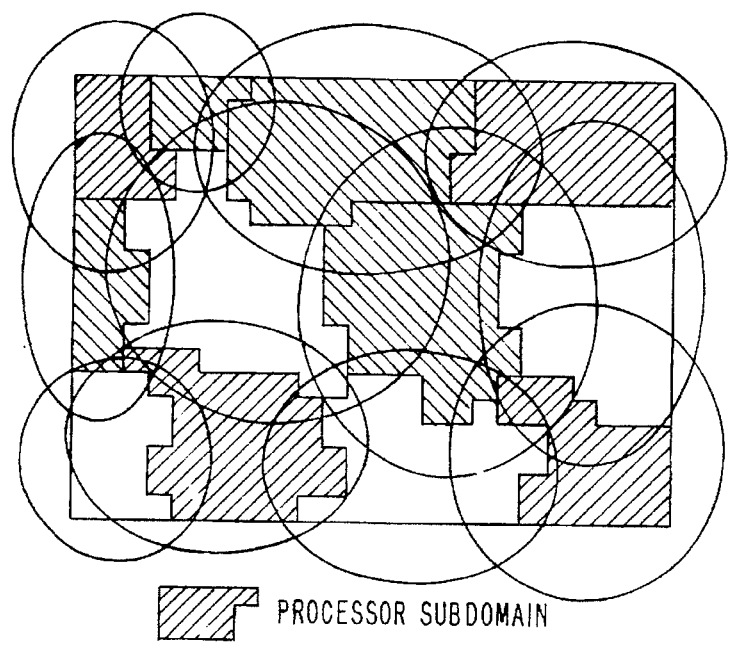
FIG. 3 is an illustration of 12 processors in 12 neighborhoods operating according to the present invention.

A "processor neighborhood" or "neighborhood" is defined as a processor (the "the neighborhood center") and all other processors for which the center has ghost elements (see FIG. 3). Every processor is the center of one neighborhood, and may belong to many neighborhoods. Tiling neighborhoods are not related to the hardware interconnection of the processors as were the neighborhoods in the work by Leiss and Reddy. A neighborhood consists of many processors which are not necessarily nearest neighbors within the hardware interconnections.

FIG. 1b illustrates the complete processor interconnections for a single processor neighborhood. In FIG. 1b, processor 4 has five neighbors. Note, however, that the remaining processors, although illustrated only as neighbors to processor 4, are actually centers of their own neighborhoods. This is indicated, partially, by the double arrows in FIG. 1b. Again, it is important to note that neighborhoods need not correspond to physical processor interconnections.

There are three classes of processors for element migration: "exporters", "importers", and "concerned partners". The "exporter" class contains all processors that send elements to other processors to better balance the work between the processors. The "importer" class consists of all processors that receive elements from other processors. "Concerned partners" are all processors owning an element adjacent to an element that is being migrated from an exporting processor to an importing processor. During a migration phase, a processor may belong to zero, one, two, or all three of the processor classes.

The applications most compatible with the tiling method of the present invention are two-dimensional, regularly gridded, element-based applications having non-uniform and potentially varying per-element processing requirements. Programs to be integrated into the tiling method are partitioned into (i) a "computation phase" and (ii) a "balancing phase". The computation phase corresponds to the application's implementation without load balancing. Each processor operates on its local data, exchanges inter-processor boundary data, and processes the boundary data. A balancing phase follows a predetermined number of computation phases in order to restore load balance. Each balancing phase comprises the following operations:

i. Determine Work Loads

Each processor determines its work load as the time to process its local data since the previous balancing phase less the time to exchange inter-processor boundary data during the computation phase. Neighborhood average work loads are also calculated.

ii. Determine Processor Work Requests

Each processor compares its work load to the work load of the other processors in its neighborhood and determines which processors have greater work loads than its own. If any are found, it selects the one with the greatest work load (ties are broken arbitrarily) and sends a request for work to that processor. Each processor may send only one work request, but a single processor may receive several work requests.

iii. Select Elements to Satisfy Work Requests

Each processor prioritizes the work requests it receives based on the request size, and determines which elements to export to the requesting processor(s). Individual elements' processing costs are used so that only enough elements to satisfy the work request(s) are exported. Details of the preferred selection method are provided below.

iv. Notify and Transfer Elements

Once elements to be exported have been selected, the importers and concerned partners are notified. Importing processors allocate space for the incoming elements, and the elements are transferred.

Synchronization guarantees that all processors enter the balancing phase at the same time. In the preferred embodiment, each processor simply executes the same number of computation phases before entering the balancing phase.

The preferred method for selecting elements for export results in a "peeling" of elements on the processor boundary, preventing the creation of "narrow, deep holes" in the element structures. Elements are assigned priorities (initially zero) based upon the locality of their element neighbors. An element's priority is decreased by one for each element neighbor in its own processor, increased by two for each neighbor in the importing processor, and decreased by two for each neighbor in a concerned partner processor. Thus, elements whose neighbors are already in the importing processor are more likely to be exported to that processor than elements whose neighbors are in the exporting processor or some other processor. When an element has no neighboring elements in its local processor, it is advantageous to export it to any processor owning its neighbors. Thus, "orphaned" elements are given the highest export priority. When two or more elements have the same priority, the processor Selects the element with the largest work load that does not cause the exported work to exceed the work request or the work available for export.

FIG. 4 illustrates an example of element priorities and selection for exporting four elements to the east neighboring processor. Initially, elements 3, 6, 9, and 12 are eligible for export. Their priorities are computed; element 3, for example, has priority −2, since it has two local neighbors (−2), one neighbor in a concerned partner processor (−2), and one neighbor in the importing processor (+2). Elements 6 and 9 share the highest priority, but since element 6 has a greater work load, it is selected. Element 5 becomes eligible for export, but its priority is low since it has three local neighbors. The priorities are adjusted, and element 9 is selected, making element 8 a candidate. The priorities are again updated, and the selection process continues with elements 3 and then 12 being selected. Although the work request is not completely satisfied, no other elements are exported, as the work loads of the elements with the highest priority, 5 and 8, are greater than the remaining work request.

The "global imbalance" of processor array $P_A$ is defined as:

$$GIMB(P_A) = \sum_{p \in P_A} (L(p) - \alpha)^2,$$

where $L(p)$ is the integer-valued load for processor $p$ and $\alpha$ is the average work load per processor. The tiling method of the present invention minimizes the global imbalance of the system within a finite number of balancing steps.

Proof: Assume some neighborhood $N_x$ with center processor $p_x$ is not balanced. During balancing phase t, some neighbor $p_j$ of $p_x$ requests $(L(p_x)-L(p_j))/2$ units of work from $p_x$. Since the two processors are unbalanced, $\beta$ units of work are transferred, where $$0<\beta \leq [(L(p_x)-L(p_j))/2],$$

and the new processor loads are $$L(p_x)_{t+1}=L(p_x)-\beta, \text{ and } L(p_j)_{t+1}=L(p_j)+\beta.$$

Writing $$L(p_x)=L(p_j)+\beta+\delta,$$

one has $$\delta \geq [(L(p_x)-L(p_j))/2].$$

Then, $$GIMB(P_A)_t-GIMB(P_A)_{t+1}=2 \beta\delta>0.$$

Thus, each local migration operation reduces $GIMB(P_A)$ by an integer value.

The function $GIMB(P_A)$ assumes a global minimum when the system is balanced. Because $GIMB(P_A)$ is non-negative for any load assignment and each neighborhood balancing operation reduces $GIMB(P_A)$ by an integer value, the minimum is attained in a finite number of neighborhood balancing steps.

When the system is balanced, $$\max_{p_i, p_j \in N} |L(p_i)-L(p_j)| \leq C,$$

for all neighborhoods N, where C is the maximum load generated by an element in the application. The maximum difference between the largest and smallest load in a balanced system is then c[d/2], where d is half as large as in applications with non-periodic boundary conditions.

Figure 5:
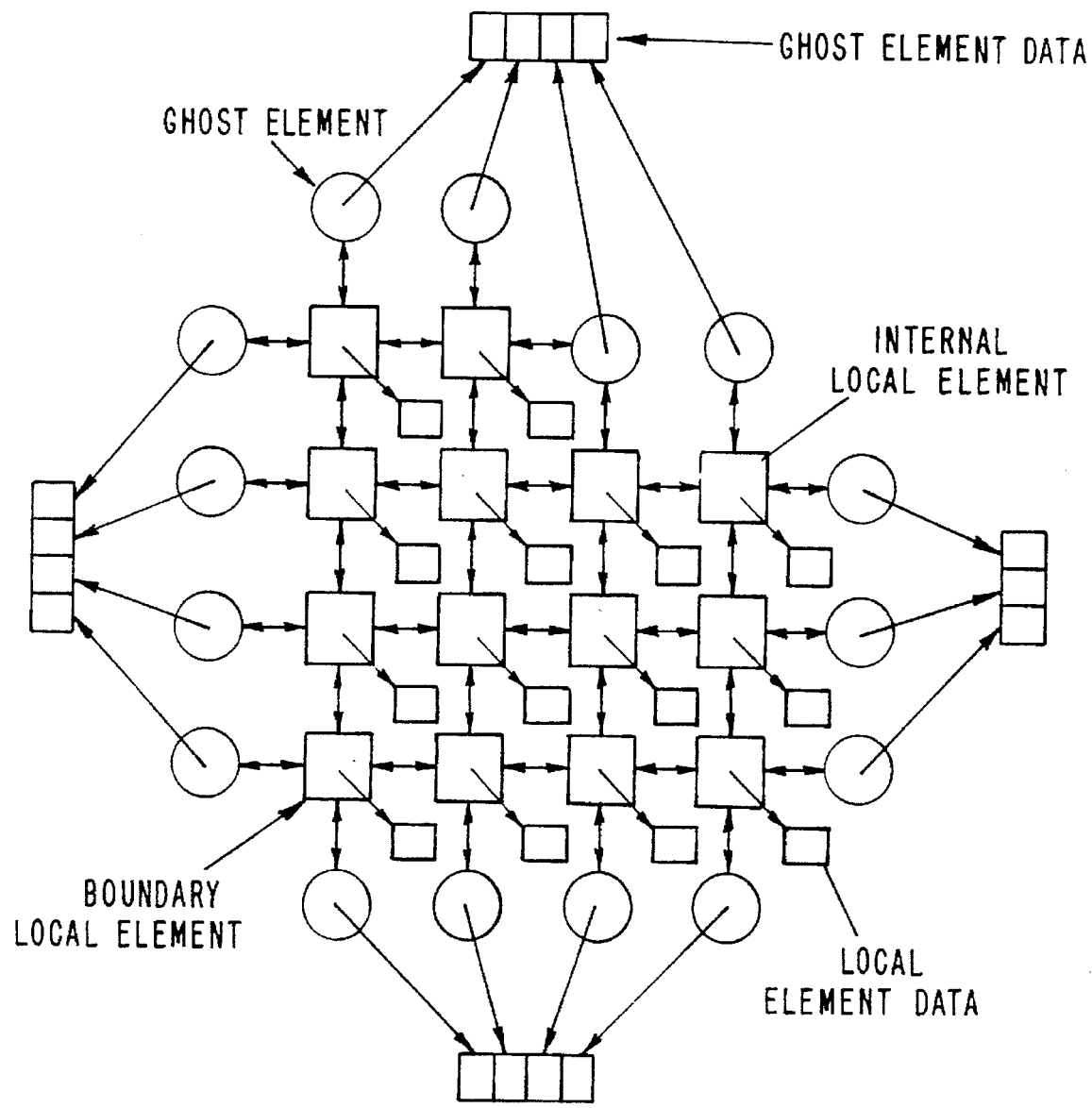
FIG. 5 is a diagram of the interconnection of elements according to the present invention.

In the preferred embodiment, elements are managed by data structures that maintain element connectivity and data position information, as shown in FIG. 5. Local elements are stored in an AVL tree to allow efficient insertion and deletion during migration. During the computation phase, local elements are accessed via in-order traversal of this tree.

Ghost elements are also stored in an AVL tree. Ghost element data are stored contiguously, so a processor can receive the data in a single message from each neighbor and read the messages directly into the ghost element data space (i.e., without buffering the data and then moving it into the ghost element data space).

Data gather operations are needed to send boundary local element data to neighboring processors. Thus, boundary local elements are maintained in multiple binary trees, one for each neighboring processor, facilitating proper ordering of the boundary element data during gather operations.

A heap is used to maintain a priority list of elements that are candidates for export. Each heap entry has two data items, the element's priority and a pointer to the element itself, to enable dynamic update of an element's priority.

The tiling method of the present invention is independent of the application. The present invention preferably uses three application interface routines, referred to herein as App_preproc(), App_compute(), and App_postproc(). The application programmer provides these routines, using the data structures for the element mesh provided by the present invention.

App_preproc() creates elements and specifies their initial values. Three major routines are preferably provided to the application pre-processing code: create_ghost_element(), create_local_element(), and convert_links(). The two element creation routines allocate element control structures and insert them into the appropriate element management trees. Element pointers are initialized to the neighboring elements' identification numbers, since the addresses of the elements may not yet be known. However, once all of the local and ghost elements have been created, the procedure convert_links() replaces the element numbers with actual pointers. The element trees are available to the application programmer to, e.g., specify parameters and data.

The processing performed by App_preproc() is generally unbalanced. Typically one processor accesses host files to get run-time initialization information and broadcasts this information to the remaining processors. No migration processing is performed during this initialization stage.

The procedure App_compute() performs the intended computations and returns a completion flag upon termination, preferably as follows:

```
BOOLEAN App_compute()
{
BOOLEAN rc;
void user_def_rtn();
extern int App_iteration, App_iteration_max;
extern ELEMENT_TREE_TYPE *Local_tree_root;
    update_tree(Local_tree_root, user_def_rtn);
    App_iteration++;
    if (App_iteration == App_iteration_max) {
        rc = FALSE;
    } else {
        rc = TRUE;
    }
    return(rc);
}
```

The Local_tree_root variable points to the AVL tree managing the processor's local elements. The procedure update_tree() traverses the tree and applies the application routine user_def_rtn() to each local element, as follows:

```
void update_tree(ELEMENT_TREE_TYPE *p_root,
                 void user_def_rtn())
{
ELDATA *p_n, *p_e, *p_s, *p_w;
ELEMENT_TYPE *p_el;
    if (p_root) {
        update_tree(p_root->left);
        p_el = p_root->p_el;
        p_me = p_el->p_eldata;
        p_n = p_el->nabor[NORTH]·p->p_eldata;
        p_e = p_el->nabor[EAST]·p->p_eldata;
        p_s = p_el->nabor[SOUTH]·p->p_eldata;
        p_w = p_el->nabor[WEST]·p->p_eldata;
        user_def_rtn(p_me, p_n, p_e, p_s, p_w);
        update_tree(p_root->right);
    }
}
```

Any processing can be scheduled in App_compute(); however, any communication done during this phase will affect processor loads that are used during the balancing phase.

App_postproc() is provided to separate the main computation from peripheral post-processing. Thus, programmers may use this routine to, e.g., transfer results to the host processor without interference from the migration processing.

The application interface to the tiling method of the invention is modularized so that application programmers who are not specialists in parallel computing science can easily improve the performance of their application programs. The invention's communication method is isolated to very few routines, leading to simple porting of the method from one massively parallel MIMD architecture to another.

The extension of the method of the present invention to 3-D regular grids is straightforward. The element interconnections remain simple; pointers in the z-direction are included with the 2-D pointers in the x- and y-directions. The concept of processor neighborhoods does not change, but each neighborhood contains more processors to track and notify of changes than in a 2-D grid, making the balancing overhead higher. The method is also similarly extensible to irregular grids and adaptive mesh refinement methods, as those skilled in the art can appreciate.

Industrial Applicability

The invention is further illustrated by the following non-limiting examples.

The computational results presented below were obtained by applying the tiling load balancing method to a massively parallel, adaptive finite element method for hyperbolic conservation laws of the form $$u_t + f(u)_x + g(u)_y = 0, \ (x,y) \in \Omega, \ t>0, \quad (1a)$$

with initial conditions $$u(x,y,0) = u^0(x,y), \ (x,y) \in \Omega \cup \delta\Omega, \quad (1b)$$

where u is the system of conservation variables modelled by the finite element discretization, f and g are flux functions, $\Omega$ is the physical problem domain, $\delta\Omega$ is the boundary of the domain, and subscripts t, x, and y denote differentiation with respect to time and space in the x- and y-directions. The Euler equations, used in computational fluid dynamics, and the shallow water equations, used in global climate modelling, are examples of hyperbolic conservation laws.

A local discontinuous Galerkin finite element method is used. Cockburn et al, "The Runge-Kutta Local Projection Discontinuous Galerkin Finite Element Method for Conservation Laws IV: The Multidimensional Case," *Math. Comp.* 54:545–81 (1990). Restricting $\Omega$ to be rectangular, partition it into rectangular elements $$\Omega_{ij} = \{(x,y) | x_{i-1} \leq x \leq x_i, \ y_{j-1} \leq y \leq y_j\}, \ i=1,2\ldots,I, \ j=1,2,\ldots,J.$$

Approximate the solution u(x,y,t) on $\Omega_{ij}$ by a basis of tensor products of Legendre polynomials on the canonical element $$\Omega_c = \{(\xi,\eta) | -1 \leq \xi, \eta \leq 1\}$$

that are continuous on the element, but may have discontinuities at inter-element boundaries:

$$u(\xi, \eta, t) = U_{ij}(\xi, \eta, t) = \sum_{k=0}^{p} \sum_{m=0}^{p} c_{ijkm}(t) P_k(\xi) P_m(\eta) \quad (2)$$

for $(\xi, \eta) \in \Omega_c$.

Multiplying Eq. (1) by a test function proportional to $P_k(\xi) P_m(\eta)$, integrating the result on $\Omega_{ij}$ while integrating the flux terms by parts, mapping $\Omega_{ij}$ to $\Omega_C$, and applying the orthogonality properties of Legendre polynomials, Szabo et al, *Introduction to Finite Element Analysis* (Wiley, New York, 1990), one constructs a weak form of Eq. 1:

$$\frac{d}{dt} c_{ijkm} = -\frac{(2k+1)(2m+1)}{2\Delta x_i \Delta y_j} (I_1 + I_2 + I_3), \quad (3)$$

$$k, m = 0, 1, \ldots, p,$$

where $$I_1 = -\int_{-1}^{1} \int_{-1}^{1} (\Delta y_j P_k'(\xi) P_m(\eta) f(U_{ij}) + \Delta x_i P_k(\xi) P_m'(\eta) g(U_{ij})) d\xi d\eta,$$

$$I_2 = \Delta y_j \int_{-1}^{1} (P_m(\eta) f(U_{ij}(1, \eta, t)) - (-1)^k P_m(\eta) f(U_{ij}(-1, \eta, t))) d\eta,$$

$$I_3 = \Delta x_i \int_{-1}^{1} (P_k(\xi) g(U_{ij}(\xi, 1, t)) - (-1)^m P_k(\xi) g(U_{ij}(\xi, -1, t))) d\xi,$$

and $\Delta x_i = x_i - x_{i-1}$, $\Delta y_j = y_j - y_{j-1}$.

The system of ordinary differential equations (3) is integrated in time using a Runge-Kutta method of order p+1. The boundary fluxes $f(U_{ij}(\pm 1, \eta, t))$ and $g(U_{ij}(\xi, \pm 1, t))$ are computed by solving an approximate Riemann problem, Roe, "Approximate Riemann Solvers, Parameter Vectors, and Difference Schemes," *J. Comp. Phys.* 43:357–72 (1981) and Sweby, "High Resolution Schemes Using Flux Limiters for Hyperbolic Conservation Laws," *SIAM J. Numer. Anal.* 21:995–1011 (1984), requiring an exchange of information across neighboring elements' boundaries. Integral terms are evaluated exactly for linear problems (f(u)=A(t)u) using the orthogonality properties of Legendre polynomials, or numerically for non-linear problems using Gauss-Legendre integration. A projection limiter, Van Leer, "Towards the Ultimate Conservative Difference Scheme IV: A New Approach to Numerical Convection," *J. Comp. Phys.* 23:276–99 (1977), is applied to the numerical solution to remove oscillations that develop near discontinuities.

An adaptive order enrichment (p-refinement) strategy is applied to the two-dimensional method of Eq. (3). The degree p of $U_{ij}$ is adjusted separately for each i=1,2,...,r and j=1,2,...J so that the estimated local error $E_{ij}(t)$ on $\Omega_{ij}$ is less than a specified tolerance $TOL_L$. For the following examples a p-refinement spatial error estimate was used:

$$E_{ij}(t) = \left\| \int_{-1}^{1} \int_{-1}^{1} |U_{ij}^{p+1}(\xi, \eta, t) - U_{ij}^{p}(\xi, \eta, t)| d\xi d\eta \right\|_{\infty} \quad (4)$$

where $U_{ij}^P$ is the $p^{th}$-degree approximation of u. When $E_{ij} > TOL_L$, the degree of the approximation on the element is increased, and the solution for the time step is recomputed. When a time step is accepted, the adaptive strategy attempts to predict the polynomial degree of the approximation for the next time step on each element by increasing p on $\Omega_{ij}$ when $E_{ij} > 0.8 TOL_L$ and decreasing p on $\Omega_{ij}$ when $E_{ij} < 0.05 TOL_L$. An outline of the adaptive refinement method follows:

```
void adaptive_p_refinement()
{
while (t<t_final) {
    perform_runge_kutta_time_step(all_elements);
    do {
        Solution_Accepted = TRUE;
        for each element {
            error_estimate = calc_estimate();
            if error_estimate > TOL_L {
                mark_element_as_unacceptable();
                increase_its_polynomial_degree();
                Solution_Accepted = FALSE;
            }
        }
        if (!Solution_Accepted) {
            recalc_soln_on_unacceptable_elts();
        }
    } while (!Solution_Accepted);
    accept_solution(all_elements);
    predict_degrees_for_next_timestep(all_elements);
    t = t + delta_t;
}
}
```

The non-adaptive Discontinuous Galerkin method is well suited to parallelization on massively parallel computers. The computational stencil involves only nearest neighbor communication regardless of the degree of the piecewise polynomial approximation and the spatial dimension. Additional storage is needed for only one row of ghost elements along each edge of the processor's uniform subdomain. Thus, the size of the problems solved can be scaled easily with the number of processors. Indeed, scaled parallel efficiencies, Gustafson et al, "Development and Analysis of Scientific Applications Programs on a 1024-Processor Hypercube," *SIAM J. Sci. Stat. Comp.* 9:609-38 (1988), of over 97% have been demonstrated on an nCUBE/2 parallel computer for problems with periodic boundary conditions. For problems with non-periodic boundary conditions, elements on the domain boundary require more computation than those in the interior of the domain, causing small processor imbalances and lower parallel efficiency. Parallel efficiency substantially degrades when adaptive p-refinement is incorporated into the method.

EXAMPLE 1

The following $$u_t + 2 u_x + 2 u_y = 0,\ 0 \leq x, y \leq 1,\ t > 0, \quad (5a)$$

was solved using the Discontinuous Galerkin method with initial and Dirichlet boundary conditions specified so that the exact solution is $$u(x,y,t) = \frac{1}{2}(1-\tanh(20x-10y-20t+5)),\ 0 \leq x, y \leq 1. \quad (5b)$$

Figure 6:
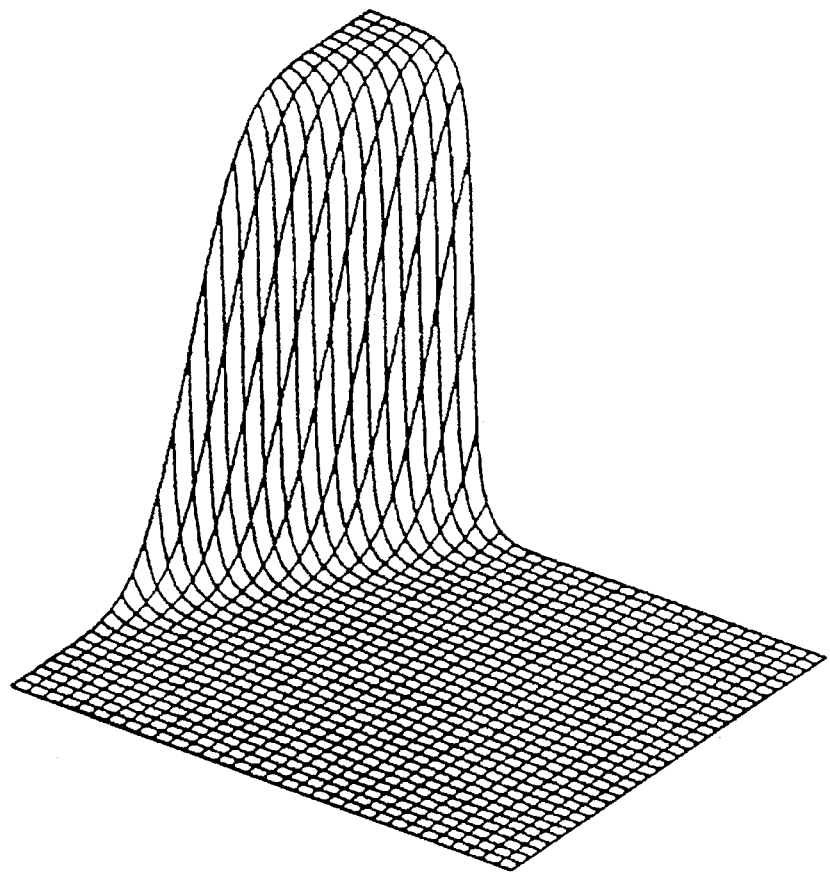
FIG. 6 is a three-dimensional graph of the exact solution of Eq. 5 after 20 time steps.
Figure 7:
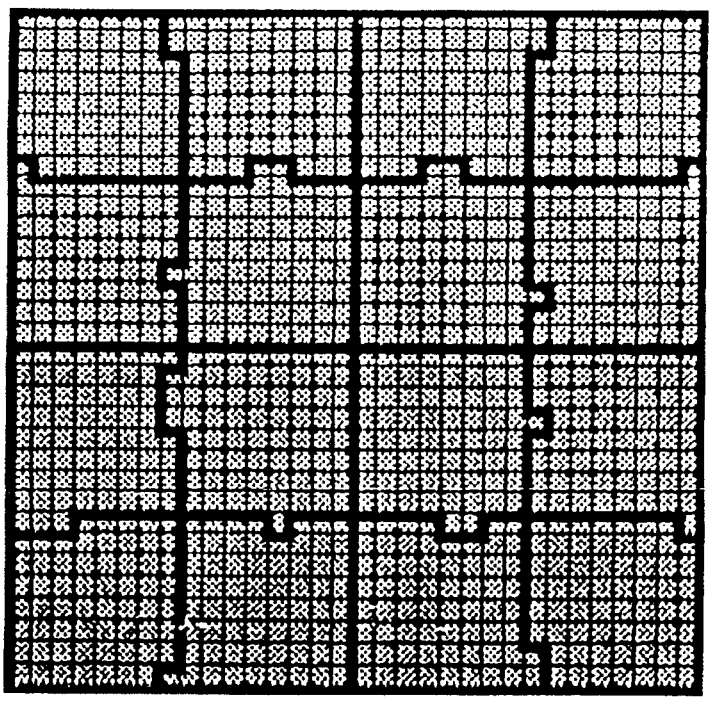
FIG. 7 is an illustration of processor domain decomposition after 20 time steps for Example 1 using a fixed-order method on 16 processors according to the present invention.

FIG. 6 shows the exact solution of Eq. 5 after 20 time steps. Eq. 5 was solved with a fixed-order method (p=3) on a 32×32 element mesh and tiling on 16 processors of the nCUBE/2 hypercube. FIG. 7 shows the processor domain decomposition after 20 time steps (dark lines represent processor subdomain boundaries). The tiling method redistributes the work so that processors containing elements on the domain boundary have fewer elements than those in the interior of the domain. The global error of the numerical solution is $4.76766 \times 10^{-3}$. The total processing time was reduced by 5.18% from 128.86 seconds to 122.18 seconds by balancing once each time step. The average/maximum processor work ratio without tiling is 0.858; with tiling, it is 0.942. Parallel efficiency is increased from 90.80% without tiling to 95.58% with tiling.

Figure 8:
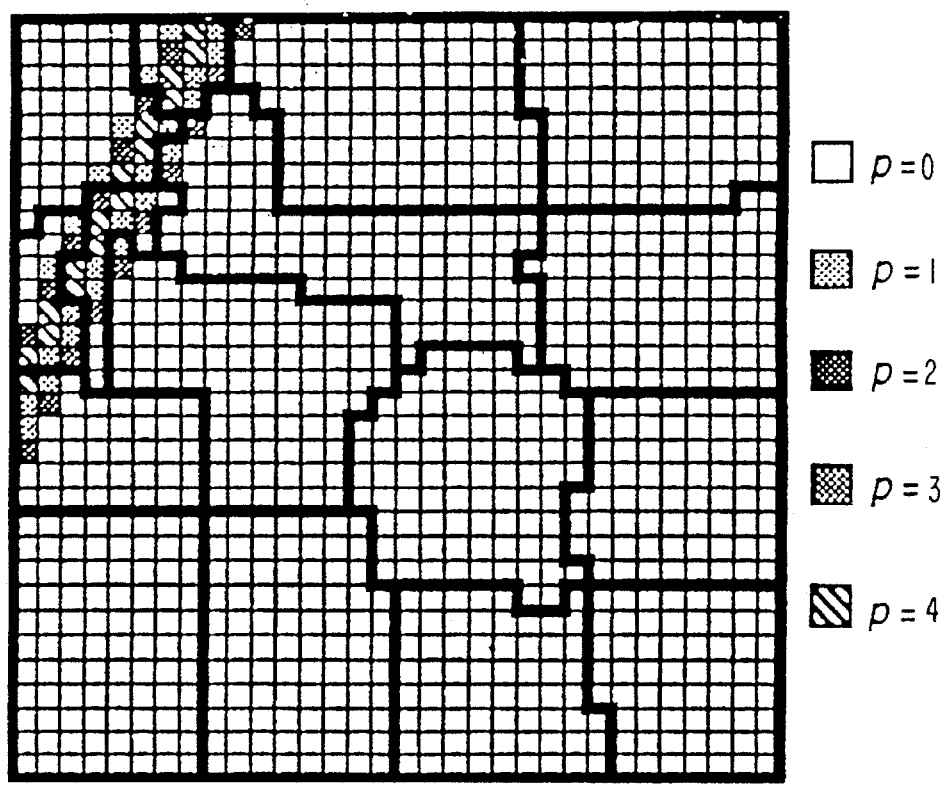
FIG. 8 is an illustration of processor domain decomposition after 20 time steps for Example 1 using adaptive p-refinement on 16 processors according to the present invention.

Eq. 5 was then solved using the adaptive p-refinement method on a 32×32 mesh with $TOL_L = 3.5 \times 10^{-5}$ and tiling on 16 processors of the nCUBE/2 hypercube. FIG. 8 shows the processor domain decomposition after 20 time steps (shaded squares are high-order elements; dark lines represent processor subdomain boundaries). The shaded elements have higher-degree approximations and thus higher work loads. The tiling method redistributes the work so that processors with high-order elements have fewer elements than those processors with low-order elements. The global error of the adaptive solution is $4.44426 \times 10^{-3}$, comparable to the fixed-order method above. The total processing time for the adaptive method was reduced 41.98% from 63.94 seconds to 37.10 seconds by balancing once each time step. Note the time reduction of the adaptive method over the fixed-order method even without load balancing. The average/maximum processor work ratio without tiling is 0.362; with tiling, it is 0.695. Parallel efficiency is increased from 35.10% without tiling to 60.51% with tiling.

EXAMPLE 2

Eq. 5 was next solved for 225 time steps on 1024 processors of the nCUBE/2 without tiling and then with balancing once each time step. A fixed-order method with p=2 produces a solution with global error $6.40644 \times 10^{-2}$. Using the tiling method once each time step reduced the total execution time 6.25% from 1601.96 seconds without tiling to 1501.90 seconds with tiling. Parallel efficiency without tiling was 82.7%; with tiling, it was 88.2%

The adaptive p-refinement method produced a solution with global error $3.84807 \times 10^{-2}$, roughly 40% less than with the fixed-order solution. With tiling, the maximum computation time (not including communication or balancing time) was reduced by 56.6% (see Table 1). The irregular subdomain boundaries created by the tiling method increased the average communication time by 3.8%. Despite the extra communication time and the load balancing time, however, one sees a 44.2% improvement in the total execution time.

TABLE 1

Performance comparison for Example 2 without and with tiling

| | Without Tiling | With Tiling |
|---|---|---|
| Total Execution Time | 988.60 seconds | 551.62 seconds |
| Maximum Computation Time | 927.18 seconds | 402.73 seconds |
| Average Communication Time | 59.62 seconds | 61.88 seconds |
| Maximum Balancing Time | 0.00 seconds | 23.87 seconds |
| Average/Maximum Work Ratio | 0.359 | 0.827 |
| Parallel Efficiency | 33.68% | 60.37% |

Figure 9:
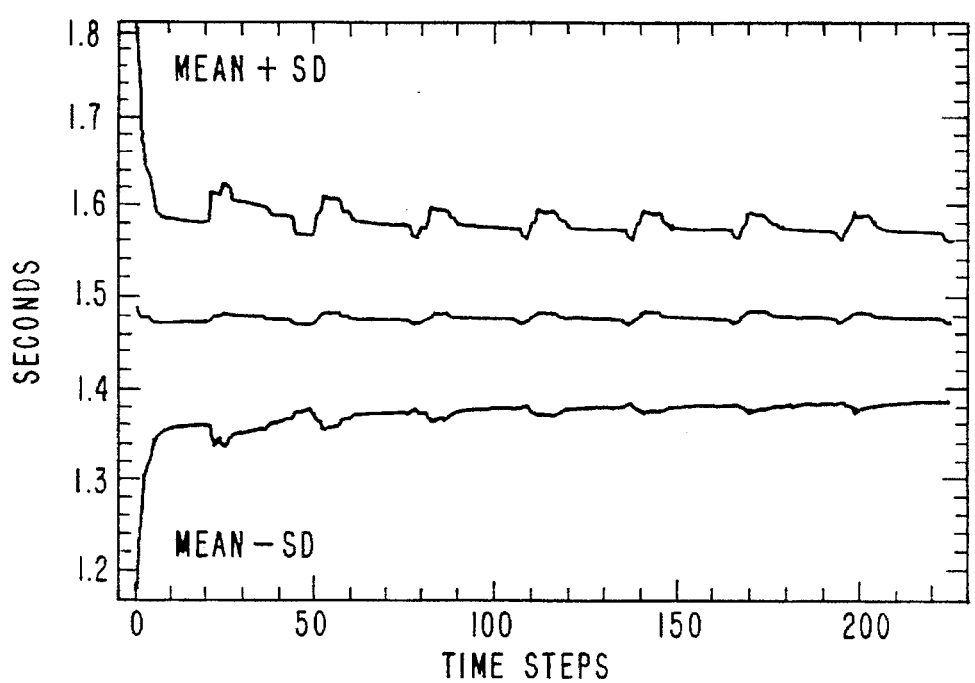
FIG. 9 is a graph of processor work load mean and standard deviation for each time step for Example 2.
Figure 10:
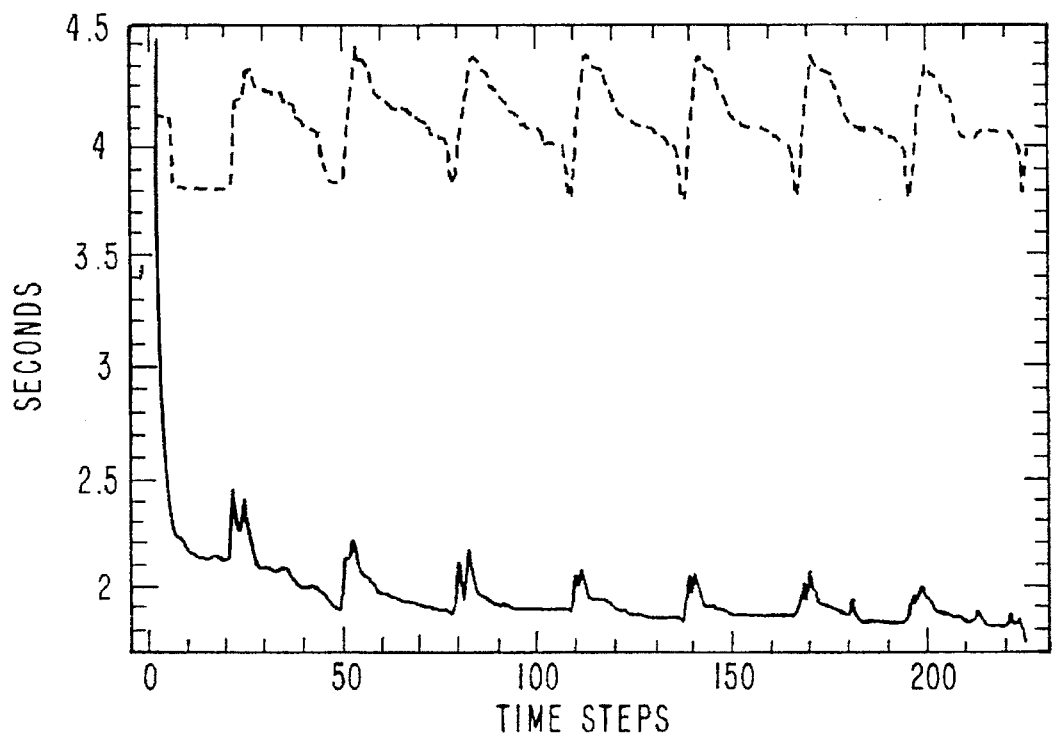
FIG. 10 is a graph of maximum work load in each time step for Example 2 with (solid line) and without (dashed line) balancing according to the present invention.

FIGS. 9 and 10 illustrate the convergence of the processor work loads from uniform domain decomposition toward global balance. FIG. 9 shows the +1 and −1 standard deviation curves of the maximum computation time for each time step. Initially, the deviation is large, indicating the processors are far from global balance. The deviations quickly become smaller, indicating the processors rapidly approach balance. FIG. 10 shows the maximum processing costs per time step, including the computation time and the balancing time, without tiling (dashed line) and with tiling (solid line). Even including the load balancing time, the balanced computation's maximum cost per time step is significantly lower than without tiling. Variations in the cost per time step without tiling illustrate the changes in computational effort caused by the adaptive finite element method.

Figure 11:
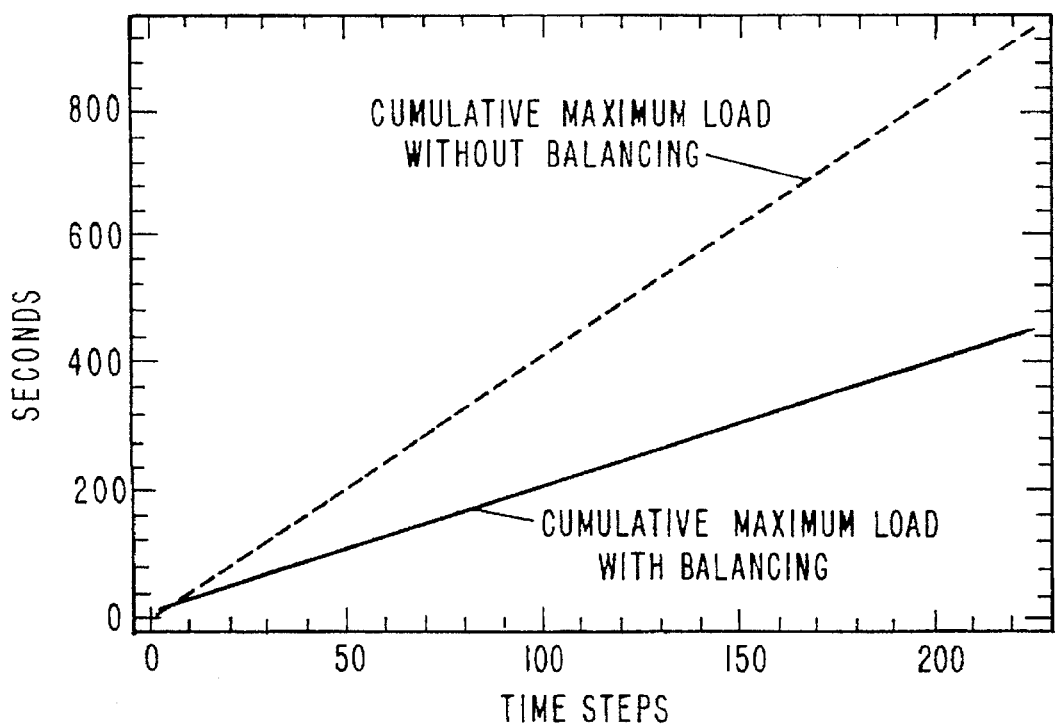
FIG. 11 is a graph of cumulative maximum loads for Example 2 with (sold line) and without (dashed line) balancing according to the present invention.

FIG. 11 illustrates the cumulative maximum processing times with and without tiling. The immediate and sustained improvement of the application's performance is shown.

The preceding examples can be repeated with similar success by substituting the generically or specifically described operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all publications cited above, and of Wheat, *A Fine Grained Data Migration Approach to Application Load Balancing on MP MIMD Machines* (Ph.D. thesis, University of New Mexico, Dept. of Computer Science, Albuquerque, December 1992) (which further discloses and exemplifies the present invention), are hereby incorporated by reference.

What is claimed is:

1. A method for dynamically maintaining global load balance in a multiprocessor system that executes an application on a parallel computer, the method comprising the steps of:
   a) providing an application for execution to a plurality of processors of the parallel computer for processing the application that is to be executed, the application comprising a plurality of data cells arranged spatially such that each data cell has one or more neighboring data cells;
   b) assigning each data cell a processor within the plurality of processors;
   c) determining for one or more of the plurality of processors all other processors in one or more corresponding processor neighborhoods;
   d) computing work loads for the one or more of the plurality of processors; and
   e) for the one or more of the plurality of processors, exporting one or more data cells to another processor in the one or more corresponding processor neighborhoods to achieve a dynamic and global balance of the work load between the plurality of processors.

2. The method of claim 1 wherein the determining, computing and exporting steps are performed repeatedly until the application has completed execution.

3. The method of claim 2 wherein global load imbalance is minimized within a finite number of iterations.

4. The method of claim 1 wherein the application comprises a finite-difference or finite-element application.

5. The method of claim 4 wherein the data cells are elements.

6. The method of claim 1 wherein the step of exporting one or more data cells to another processor in the one or more corresponding processor neighborhoods comprises prioritizing data cells to select which data cells to export.

7. The method of claim 6 wherein the step of prioritizing data cells comprises the steps of:
   a) initially assigning a zero priority to all data cells;
   b) decreasing a data cell's priority by one for each of the one or more neighboring data cells assigned to the same processor as the data cell;
   c) increasing a data cell's priority by two for each of the one or more neighboring data cells assigned to a processor requesting importation of the data cell; and
   d) decreasing a data cell's priority by two for each of the one or more neighboring data cells assigned to a concerned partner processor.

8. The method of claim 1 wherein the plurality of data cells are arranged in a two-dimensional grid.

9. The method of claim 1 wherein the plurality of data cells are arranged in a three-dimensional grid.

10. The method of claim 1 wherein the determining step comprises determining for one or more of the plurality of processors all other processors in the one or more corresponding processor neighborhoods.

11. An apparatus for dynamically maintaining global load balance in a multiprocessor system that executes an application on a parallel computer, said apparatus comprising:
    means for providing an application for execution to a plurality of processors of the parallel computer, the application comprising a plurality of data cells arranged spatially such that each data cell has one or more neighboring data cells;
    means for assigning each data cell to a processor within the plurality of processors;
    means for determining for one or more of the plurality of processors all other processors in one or more corresponding processor neighborhoods;
    means for computing work loads for one or more of the plurality of processors; and
    means for exporting, for one or more of the plurality of processors, one or more data cells to another processor in the one or more corresponding processor neighborhoods to achieve a dynamic and global balance of the work load between the plurality of processors.

12. The apparatus of claim 11 wherein said determining, computing and exporting means comprise means for performing such functions repeatedly until the application has completed execution.

13. The apparatus of claim 12 wherein global load imbalance is minimized within a finite number of iterations.

14. The apparatus of claim 11 wherein said application comprises a finite-difference or finite-element application.

15. The apparatus of claim 14 wherein the data cells are elements.

16. The apparatus of claim 11 wherein said means for exporting comprises the means for prioritizing data cells to select which data cells to export.

17. The apparatus of claim 16 wherein said means for prioritizing data cells comprises:
    means for initially assigning a zero priority to all data cells;
    means for decreasing a data cell's priority by one for each of the one or more neighboring data cells assigned to the same processor as the data cell;
    means for increasing a data cell's priority by two for each of the one or more neighboring data cells assigned to a processor requesting importation of the data cell; and
    means for decreasing a data cell's priority by two for each of the one or more neighboring data cells assigned to a concerned partner processor.

18. The apparatus of claim 11 wherein the plurality of data cells are arranged in a two-dimensional grid.

19. The apparatus of claim 11 wherein the plurality of data cells are arranged in a three-dimensional grid.

20. The apparatus of claim 1 wherein said determining means comprises means for determining for one or more of the plurality of processors all other processors in the one or more corresponding processor neighborhoods.

* * * * *